United States Patent [19]

Goater

[11] Patent Number: 4,753,335
[45] Date of Patent: Jun. 28, 1988

[54] LUMBER POSITIONER

[76] Inventor: George H. Goater, 7491 Crawford Dr., Delta, B.C., Canada, V4C 6X8

[21] Appl. No.: 702,967

[22] Filed: Feb. 19, 1985

[30] Foreign Application Priority Data

Feb. 17, 1984 [CA] Canada .................................. 447689

[51] Int. Cl.$^4$ ............................................ B65G 47/26
[52] U.S. Cl. .................................. 198/456; 198/463.2; 198/463.3
[58] Field of Search ............ 198/456, 457, 416, 463.2, 198/463.3, 469.1, 575, 576

[56] References Cited

U.S. PATENT DOCUMENTS

| | | | |
|---|---|---|---|
| 2,778,474 | 1/1957 | Koning | 198/456 |
| 2,918,951 | 12/1959 | Haumann | 198/456 |
| 3,134,476 | 5/1964 | Pierson et al. | 198/457 |
| 3,285,389 | 11/1966 | Kaplan | 198/456 |
| 4,174,774 | 11/1979 | Bourgeois | 198/457 |

FOREIGN PATENT DOCUMENTS

| | | | |
|---|---|---|---|
| 30372 | 11/1959 | Finland | 198/456 |
| 216454 | 10/1967 | Sweden | 198/456 |
| 309201 | 3/1969 | Sweden | 198/456 |
| 808681 | 2/1959 | United Kingdom | 198/457 |

*Primary Examiner*—Robert J. Spar
*Assistant Examiner*—Lyle K. Kimms
*Attorney, Agent, or Firm*—Townsend & Townsend

[57] ABSTRACT

A lumber positioner having one or more parallel straight decks, and one or more parallel angle decks disposed transversely of, and adjacent a straight deck to extend at an angle thereto. One or the other of the straight deck or angle deck, is raised and lowered so that at least a portion of a piece of lumber extending across aligned lumber carrying surfaces of respective decks, can be transferred between a normal position, corresponding to the piece sitting on the lumber carrying surface of the straight deck, and a position vertically spaced therefrom in which it is sitting against a lumber contacting surface of the angle deck, so that the lumber piece can travel in a direction along either as desired. Preferably, a plurality of straight decks are constructed alike with each having at least one section. One or the other of each straight deck section, and each angle deck, is preferably provided with a plurality of elevated sections for carrying or moving lumber, spaced therealong from adjacent elevated sections thereon a distance equal to a lug spacing times the number of sections or angle decks present. As a result, one of the elevated sections will pass below the upper surface of each chain, while another appears above the other end thereof.

12 Claims, 3 Drawing Sheets

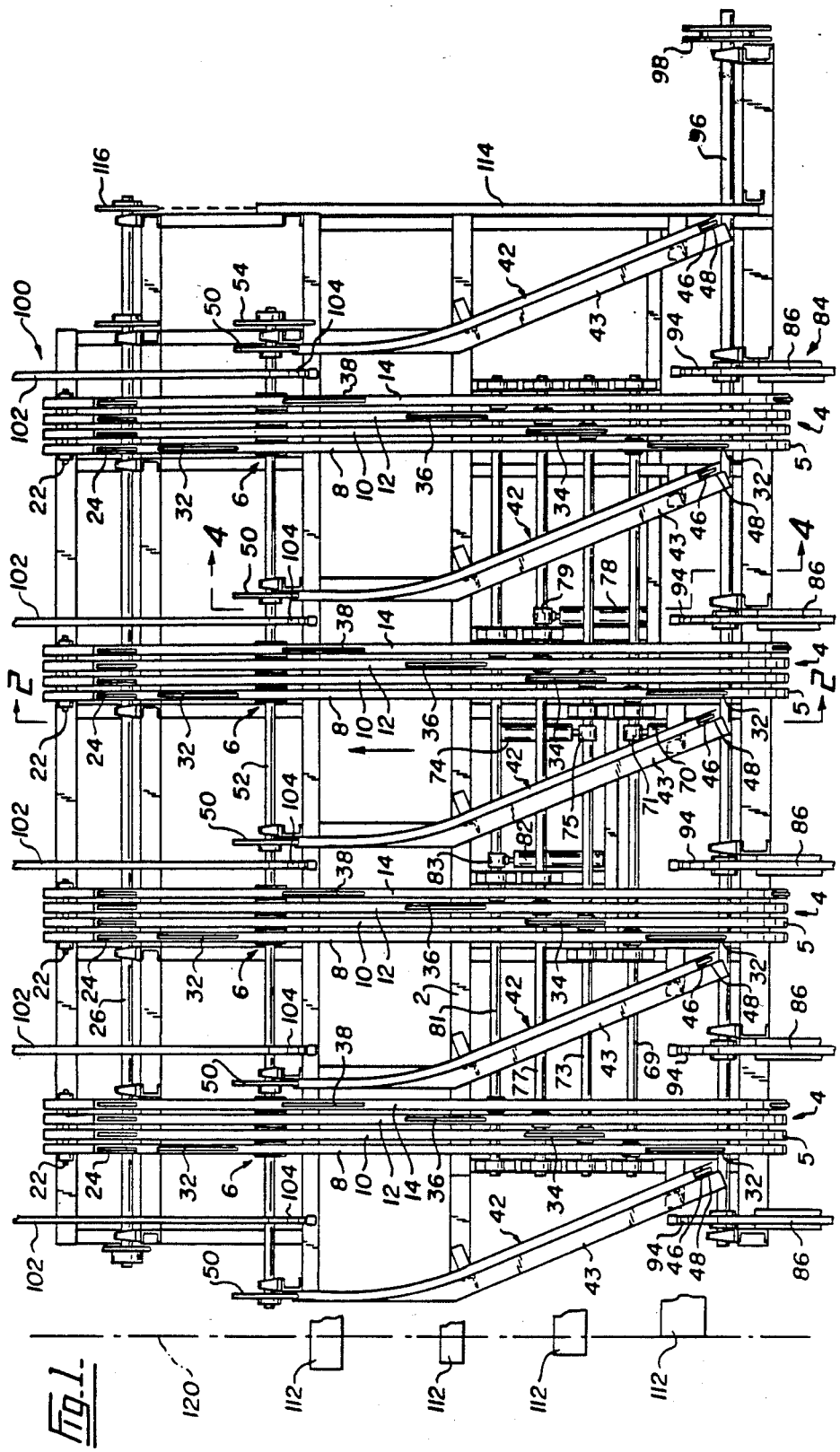

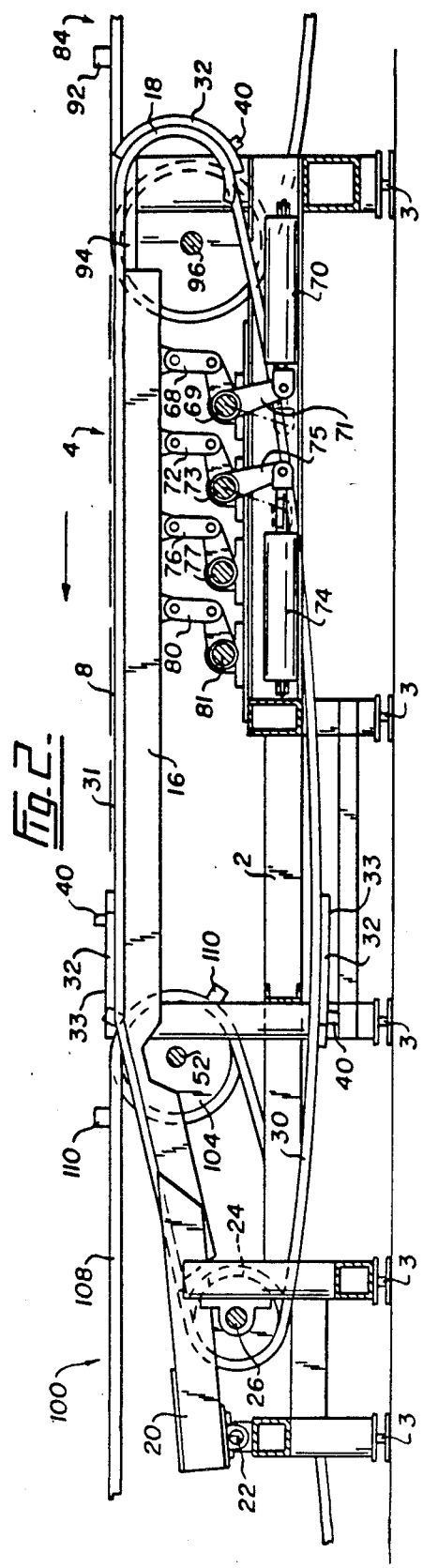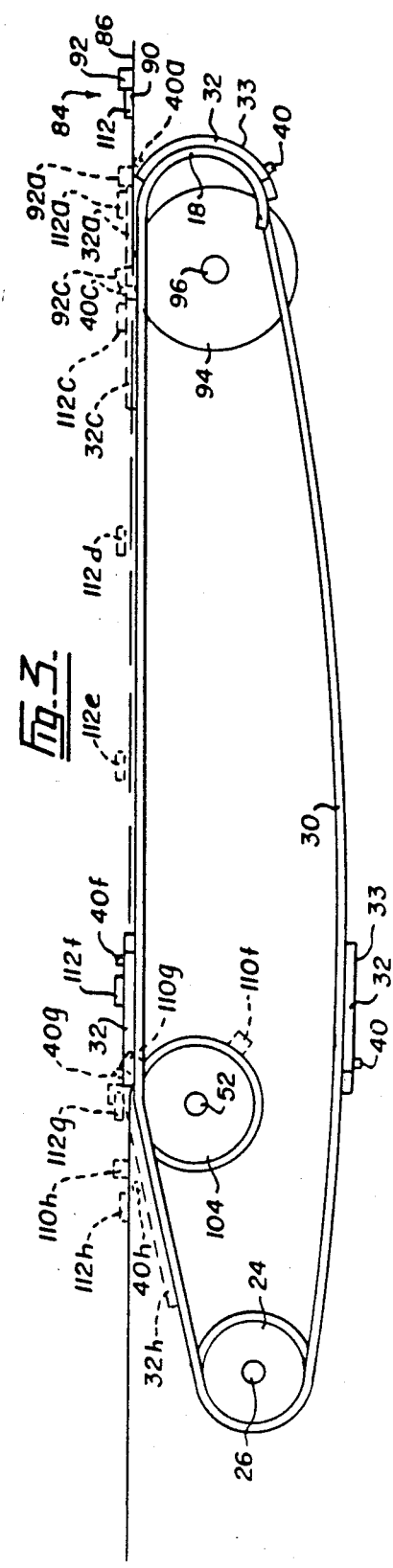

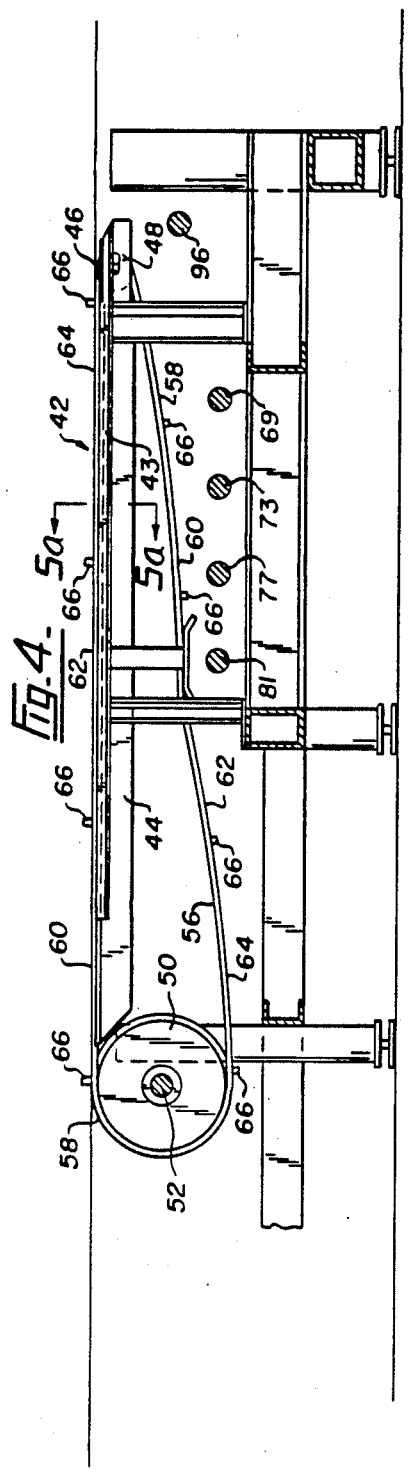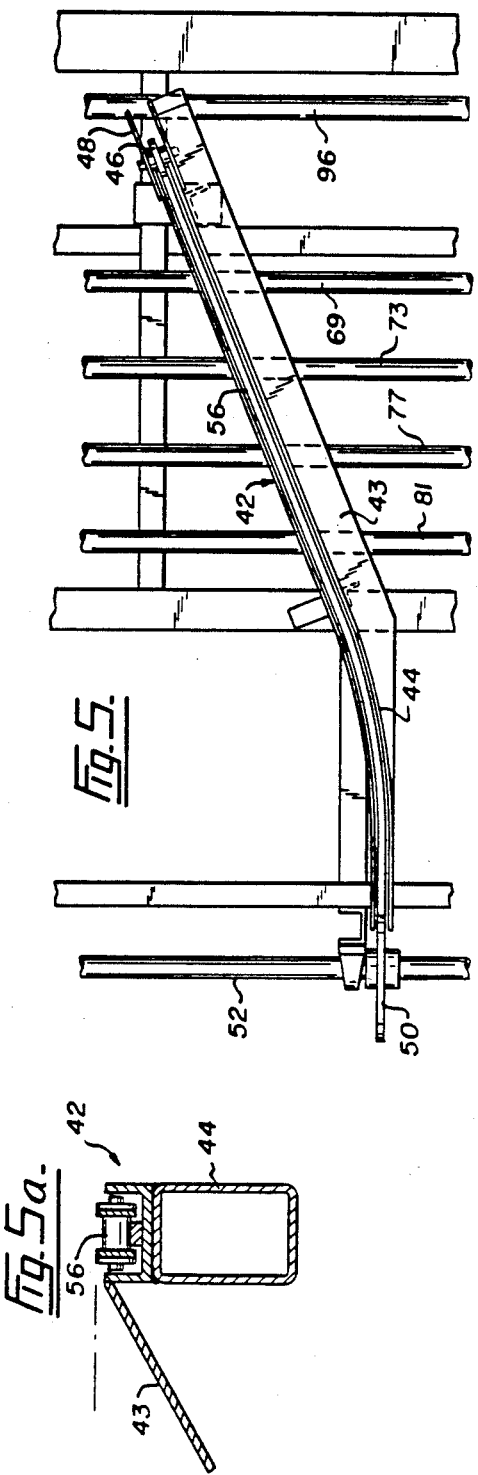

LUMBER POSITIONER

FIELD OF THE INVENTION

This invention relates to a lumber positioner adapted to lengthwise position a piece of lumber prior to trimming to length.

DESCRIPTION OF PRIOR ART

In a typical dimension lumber mill, prior to trimming, pieces of lumber are moved sideways along a lugged transfer deck (which includes a plurality of spaced apart, lugged chains) by abutting respective sets of moving lugs thereon. The lumber pieces if scanned, pass through an electronic scanner which determines the shape of the pieces of lumber and activates varying saws above a following trimmer saw deck to trim the lumber pieces for a maximum efficient utilization of them. However, the saws are typically spaced apart a distance of about two feet from one another, so that depending upon the physical end defects of the lumber pieces, up to almost two feet on each end could be wasted from each lumber piece by the electronic scanner activating the correct saw to eliminate the end defect thereon. Given the volume of lumber processed by a typical lumber mill, such can result in considerable wastage of useful wood. In order to minimize such wastage, a lumber positioner has previously been developed which utilizes a plurality of rollers driven in a direction at right angles to the transfer deck, along with a means to transfer lumber along the transfer deck, but above the rollers when the desired lengthwise movement has been obtained. The lumber can have its end forced to abut an angled fence as a result of movement by the rollers acting on the board. When on the rollers the lumber also continues to move sideways, thereby resulting in a selected amount of lengthwise movement against the angled fence, and is raised above the rollers at a time previously determined. Such an arrangement though has the disadvantage that wet or icy lumber will often slip on the rollers while still being moved sideways, so that the previously determined optimum lengthwise movement does not take place. Such slippage is emphasized by the attempt of the rollers to suddenly impose a lengthwise acceleration on the piece of lumber. In addition, such devices suffer from the fact that tapered ends of the pieces of lumber abutting the angled fence can be so weak as to collapse or break under impact by the rollers against the angled fence, so that the optimum lengthwise movement of the piece of lumber will be overshot. Further, such a device suffers from the fact that it can only position provided that the boards have previously been even-ended against a fence.

It is desirable then to have a lumber positioning device which can relatively accurately move pieces of lumber selected lengthwise distances, and which preferably has a relatively high rate at which it can handle lumber.

SUMMARY OF THE INVENTION

A lumber positioner is provided, which broadly comprises a straight deck with a lumber carrying surface movable along it, so as to move lumber sitting on it in the direction of the straight deck. An angle deck is disposed transversely of, and extending at an angle adjacent to the straight deck. The angle deck has a lumber contacting surface which will move lumber positioned against it, in the direction of the angle deck. This lumber contacting surface is alignable with the lumber carrying surface of the straight deck. An angle and straight deck drive means is provided for driving both of the lumber carrying surface and lumber contacting surface, such that they are maintained in alignment when the deck drive means is driven. An elevator means, when activated, can lower or raise one of the foregoing two surfaces, such that at least a portion of a piece of lumber sitting on the lumber carrying surface, can be lowered on to or raised from the lumber contacting surface. It should be noted that throughout this application, the angle between any straight deck or straight decks, and angle deck or angle decks, is measured between a vector pointing along the straight decks in the direction in which they normally move, and which vector commences from a position adjacent an outfeed end of the straight deck.

In the preferred embodiment of the positioner, the lumber contacting surface comprises a lumber carrying surface, upon which at least a portion of a piece of lumber can sit. In this embodiment, at least a portion of a piece of lumber extending across (which does not necessarily mean contacting) aligned lumber carrying surfaces of respective decks, can be raised or lowered preferably between an upper, normal position, corresponding to the piece of lumber sitting on the lumber carrying surface of the straight deck, and a lower position sitting on the lumber carrying surface of said angle deck.

The preferred embodiment of the lumber positioner described, has a straight deck set with a plurality of spaced apart, parallel, straight decks. Each of the straight decks can have one, or a plurality of parallel, sections, and the term "deck" as used in this application can denote the presence of one or more sections. Each of the sections has a lumber carrying surface spaced along the deck from the lumber carrying surfaces of any other sections thereof. The lumber carrying surfaces of corresponding sections in the straight decks define respective sets of alignable lumber carrying surfaces of the straight deck, each of which sets is alignable with a corresponding set of lumber carrying surfaces of said angle deck. The set of lumber carrying surfaces of the straight deck can move lumber sitting thereon in the direction of the straight decks. An angle deck set is provided which has a plurality of spaced apart, parallel angle decks, disposed transversely of, and in alternating sequence with the straight decks to extend at an acute angle thereto. Each angle deck can have one or more sets of respective, alignable lumber carrying surfaces thereof, each of which sets is alignable with a corresponding set of lumber carrying surfaces of said straight deck. The lumber carrying surfaces of the angle deck are arranged to move lumber sitting thereon in the direction of the angle decks. Angle and straight deck drive means is provided which is analogous to that described above. An elevator means is further provided which is connected so that when activated it moves each set of alignable lumber carrying surfaces of said straight deck independently of any other sets thereof, between an upper and a lower position, in which the set is above and below respectively, the corresponding set of lumber carrying surfaces of the angle deck. By such an arrangement, a piece of lumber extending across aligned members of both corresponding sets, can be transferred between respective positions sitting thereon.

Each of the angle decks and the straight deck, or the straight deck sections, preferably comprise continuous belts. The angle decks preferably all have the same number of sections, and the sets of alignable lumber carrying surfaces of the straight deck set preferably comprise surfaces of sets of alignable elevated sections disposed on outer sides of respective belts. The elevator means in such case is connected to move each set of elevated sections between the upper and lower positions by moving the corresponding set of straight deck sections between upper and lower positions thereof, respectively, such that the upper surface of the chains of the straight deck sections when in the upper or lower position, are below the lumber carrying surfaces of the angle decks.

Preferably a plurality of elevated sections are provided on each belt of each straight deck section, such elevated sections being spaced apart on each belt a distance equal to the number of sections of the straight deck times the lug spacing. By such arrangement, at any given time during operation of the positioner with the various lugs aligned, there will be a number of equally spaced sets of aligned elevated sections on the upper surfaces of the straight decks, equal in number to the number of straight deck sections. Lugs are usefully provided on both deck sets, adjacent the rear ends of respective elevated sections, and from positions adjacent the rear ends of respective lumber carrying surfaces of the angle deck set.

A lumber positioning apparatus incorporating the previously described lumber positioner, as well as a method by which such lumber positioner operates, are also provided.

DRAWINGS

Embodiments of the invention will now be described with reference to the drawings in which:

FIG. 1 is a somewhat schematicized plan view of a lumber positioner of the present invention;

FIG. 2 is a vertical cross section along the line 2—2 of FIG. 1;

FIG. 3 is a somewhat schematicized view similar to that of FIG. 2 showing the transfer of a single piece of lumber between various decks, with only one section of a straight deck being shown;

FIG. 4 is a vertical cross section along the line 4—4 of FIG. 1;

FIG. 5 is a detailed plan view of an angle deck;

FIG. 5a is a cross section along line 5a—5a of FIG. 4.

DETAILED DESCRIPTION OF EMBODIMENTS OF THE INVENTION

The positioner disclosed in the drawings of FIGS. 1 through 5a, consists of a frame 2 with suitable levelling feet 3. A straight deck set consists of four essentially identically constructed straight decks 4, having infeed ends 5 and outfeed ends 6 which also define infeed and outfeed ends respectively of the positioner. Each straight deck 4 has four essentially identically constructed sections 8, 10, 12 and 14, in the form of four runners, corresponding sections in each straight deck 4 having been numbered the same. Each straight deck section (again each being in the form of a runner) has a frame 16 with a curved guide 18 adjacent the input end of the deck, and an end 20 pivotally mounted on pivot 22. A sprocket 24 is driven by a shaft 26 rotatably mounted on frame 2, shaft 26 in turn being driven by any "synchronized" drive source from a trimmer saw for reasons which will become apparent later. An endless belt in the form of endless chain 30 is disposed on frame 16 and about sprocket 24. Chain 30 of section 8 has three elevated sections 32, spaced apart on chain 30 such that only one entire elevated sections is on the upper side of chain 30 at any one time (the "upper side" of a belt being the uppermost linear side, and excluding the downsloping portion of the belts of the straight deck set near the outfeed end of it). The chains 30 on sections 10, 12, and 14 are constructed similarly to chain 30 on section 8, except the elevated sections have been numbered 34, 36, and 38, respectively. The elevated sections of corresponding sections form sets of aligned elevated sections, namely a set of elevated sections 32, a set of elevated sections 34, a set of elevated sections 36, and a set of elevated sections 38. The sets of elevated sections define on their surfaces 33, respective sets of alignable lumber carrying surfaces, which in operation of the positioner are aligned as shown in FIG. 1, each set being spaced from the next adjacent set by a distance defined as a "lug spacing". The spacing of elevated sections 32 on any one chain is equal to the number of sections in each straight deck multiplied by one lug spacing. Each elevated section 32, 34, 36, 38 is provided with a lug 40 extending from adjacent rear end thereof in a direction away from the corresponding chain 30 in the manner as shown most clearly in FIG. 2.

An angle deck set is provided which consists of five essentially identically constructed angle decks 42, each angle deck consisting of only one section (in the form of a runner). Each angle deck has a frame 44 which in turn includes idler sprocket 46 adjustably slidably mounted on an infeed end portion 48 of frame 44. Each angle deck 42 further includes a sprocket 50 connected to a shaft 52. Shaft 52 is provided with a sprocket 54 thereon, for driving the angle deck. Each angle deck 42 has a continuous belt in the form of a chain 56 disposed about the corresponding frame 44 and sprocket 50. Chain 56 has a total of eight lumber carrying surfaces, consisting of two of each of lumber carrying surfaces 58, 60, 62, and 64, which lumber carrying surfaces are simply portions of the outer surface of chain 56. A plurality of lugs 66 are provided, each of which extends from the outer side of a chain 56 adjacent the rear end of each corresponding lumber carrying surface 58, 60, 62, or 64 of all of the angle decks 42, and hence of the angle deck set. Corresponding lumber carrying surfaces of the angle deck set are numbered alike, and such corresponding surface are alignable by adjusting the relative rotational positions of the sprockets 50 on shaft 52. Furthermore, each such set of corresponding lumber carrying surfaces, namely set 58, set 60, set 62, and set 64, are alignable with corresponding sets of ramps 32, 34, 36, and 38, respectively, of the straight deck set, by adjusting the relative rotational positions of sprockets 58 and 24, by adjusting either or both of the foregoing sets about their respective shafts 52 and 26, as previously described. FIG. 1 of course shows each set of aligned lumber carrying surfaces 32, 34, 36 and 38, of the straight decks 4, each in alignment with a corresponding set of aligned lumber carrying surfaces 58, 60, 62, and 64, respectively, of the angle decks 42. A shear plate 43 is provided to extend lengthwise adjacent each angle deck 42, while transversely sloping upward to a corresponding chain 56 of that angle deck.

An outrigger runner 114 is also provided as part of the positioner. Outrigger runner 114 is present to support the ends of pieces of lumber which may extend over it as they are moving sideways or lengthwise on the positioner. To accomplish such purpose with minimum friction, outrigger runner 114 is provided with a surface having a low coefficient of friction, and upon which an end of a piece of lumber can rest and move lengthwise. The chain of runner 114 is driven at the same speed as chains 30 of the straight deck 4, by means of the chain being engaged over sprocket 116 which is in turn disposed on drive shaft 26.

Elevator means are provided which consist of pistons 70, 74, 78, and 82 connected to the frame 2, respective connecting links 71, 75, 79, and 83 pivotally connected to the ends of piston rods of respective pistons, elevator shafts 69, 73, 77, and 81 fixedly connected to the ends of respective drive links, and link sets 68, 72, 76, and 80 the members of each set of which are connected to corresponding sections of straight decks 4 and a corresponding elevator shaft. Each of the link sets 68, 72, 76, and 80 has an upper link pivotally connected to a pair of ears fixedly attached to a corresponding straight deck section, and a lower link pivotally attached at one end to a lower end of the upper link and fixedly attached at the other end to a corresponding elevator shaft. The upper links of the link sets 68, 72, 76, 80 are the same length, while the lower links thereof are progressively shorter moving through the link sets in the foregoing order. In addition, the connecting links become progressively shorter proceeding in the order of links 71, 75, 79 and 83. As a result of the arrangement of the foregoing components, movement of a piston rod of any of the pistons, between extreme positions thereof, will result in rotation of a corresponding elevator shaft. Such in turn will act through attached link sets to pivot attached corresponding sections of the straight decks 4 about pivot points 22, so as to move them between an upper position (such as shown in FIG. 2) and a lower position, and as a result move the surfaces of a corresponding ramp set between an upper position and a lower position. When any set of corresponding sections of the straight decks 4 are in the upper position, the surfaces of a corresponding set of ramps at that time disposed on the upper sides of respective belts, extend above a plane defined by upper surfaces 31 of the chains of the straight deck sections when in their upper positions and above the chains 56 of the angle decks 42. Furthermore, such set when in the lower position, extends below the upper surfaces of chains 56.

As an example of the above, piston 74 with its piston rod in the fully extended position as shown in solid lines in FIG. 2, holds the set of sections 10 of straight decks 4 in its upper position, and hence holds the set of ramps 34 in its upper position. In such a position, the upper surfaces of chains 30 of straight decks 4, are still below the lumber carrying surfaces of chains 56 of angle decks 42. This avoids interaction between the chains of the straight deck and lumbers moving on the angle deck. When the piston rod of piston 74 is retracted to its fully retracted position, elevator shaft 73 rotates thereby moving the attached set of links 72, which in turn moves the set of corresponding sections 10 of straight decks 4 to its lower position, and hence moves the set of elevated sections 34 to its lower position such that such set when on the upper side of respective belts 30 now have their surfaces below the upper surfaces of chains 56 of angle decks 42. The other sets of corresponding sections of the straight decks 4 are raised and lowered between their upper and lower positions by means of their corresponding link sets, connecting links, and pistons, in an analogous manner to that described. However, it will be noted that pistons facing in the reverse direction from piston 74, such as piston 70, will extend from its fully retracted position to its fully extended position in order to lower its attached set of corresponding sections of straight decks 4 (which in the case of piston 70 would be sections 8). It will be appreciated of course that the lower link of the link sets 68, 72, 76, and 80, are made shorter proceeding through the link sets in the foregoing order (or from right to left in FIG. 2) and their corresponding connecting links are also made shorter, so that all of the straight deck sections are pivoted about their pivot points 22 to be raised and lowered the same distances. That is, since for example link set 80 is positioned closer to the pivot point 22 of its set of corresponding sections 8 of straight decks 4 than are the other link sets, only a shorter vertical movement of link set 80 is required to accomplish the same vertical change in height of sections 8 as would be accomplished by the other link sets which are spaced further away from the pivot points 22 of their respective sets of corresponding straight deck sections.

In a typical installation, the lumber positioner described is installed between a transfer deck 84 and a trimmer infeed deck 100, the outfeed and infeed ends respectively thereof, only being shown in FIGS. 1 and 2. The transfer deck 84 has five continuous chains 86 passing over respective sprockets 94, which are rotatably adjustable on transfer deck drive shaft 96 to drive the transfer deck set 84, in particular the chains 86 thereof. The chains 86 are provided with sets of respective, aligned lugs 92 thereon. The transfer deck 84 can be said to be aligned with the straight deck set, with an outfeed end of the former disposed adjacent an infeed end of the latter. Shaft 96 of the transfer deck 84 is driven by sprocket 98 from a suitable drive source such that the transfer deck set 84 is driven at the same rate as the straight deck set.

The trimmer infeed deck 100 is likewise aligned with the outfeed end of the lumber positioner described, the infeed deck 100 having five sections 102 each of which again includes a continuous belt in the form of chain 108 disposed about a corresponding idler sprocket 104, and shaft 52. Chains 108 are provided with sets of aligned lugs 110.

Both the transfer deck 84 and infeed deck 100 are synchronized at identical rates (i.e. lug rates) with the straight deck in the manner to be described, as a result of the spacings between lumber carrying surfaces (including ramps) thereon, and as a result of the relative speeds at which the chains of the three decks are driven. As is about to be described, each chain of the straight deck sets is driven at a speed faster than the transfer deck 84 and trimmer infeed deck 100 by a proportion equal to one quarter of the distance between adjacent lugs 40 of any given chain 30 of the transfer deck 4, divided by the distance between adjacent lugs 92 on any given chain 86 of the transfer deck 84, which latter distance is the same as the distance between lugs 110 on trimmer saw deck 100. The chains 56 of the angle deck set are of course driven at a linear speed somewhat faster than the chains 30 of the straight deck but at the same lug rate thereof, in order to maintain each set of aligned elevated sections, for example elevated sections 32 or elevated sections 34, in alignment with the corresponding set of lumber carrying surfaces of the chains 56 of the angle deck set (in the previous examples sets of surfaces 58 and 60, respectively). All of the deck sets can be driven from the same source of motive power, namely from a trimmer saw, the differential drive rates being accomplished by using different sized drive sprockets on respective drive shafts.

In existing installations to which the lumber positioner described is to be retrofitted, normally the transfer deck 84 will be part of the infeed deck 100. To fit in the lumber positioner described, the transfer deck 84 would be shortened, creating infeed deck 100 and the lumber positioner described interposed therebetween as has already been described and shown in the figures. Preferably, the straight deck set and angle deck set are positioned at a height such that the surfaces 33 of the elevated sections when on the upper side of respective belts and in the upper position, are above the lumber carrying surfaces 90 of the straight decks 86. This is to accomplish more positive transfer and acceleration of a piece of lumber from the transfer deck set to the straight deck set, the chains 30 of the straight deck set again moving at a faster speed than the chains 86 of the transfer deck set 84.

In the preferred mode of operation of the lumber positioner and lumber positioning apparatus described, a piece of lumber 112 is moved along a set of aligned lumber carrying surfaces 90 by the chains 86 of transfer deck 84, as a result of abutting a corresponding set of aligned lugs 92. Typically, but not essentially, such lumber has been ended to a straight fence (not shown) on the infeed deck and thereby has an end aligned with lumber line 120, so as to facilitate removal should such be necessary where a piece of lumber is uselessly deformed. Lumber 112 then passes through an optical scanner (not shown) of a known type, which together with appropriate computer hardware and software connected thereto, ascertains what, if any, lengthwise movement of the piece of lumber 112 will be required for maximum efficient utilization of such piece of lumber. When on the transfer deck 84, the piece of lumber need not be at any particular lengthwise position therein, as lengthwise positioning will be accomplished by the positioner. Of course, the foregoing is subject to ensuring that the lumber will be adequately supported at any point on the positioner to which it may move. This is unlike conventional positioners where the lumber pieces must all first be positioned with their ends abutting a straight end fence.

The piece of lumber then moves along to the outfeed end of transfer deck set 84 to be transferred onto the infeed end of the straight deck set. Such transfer is accomplished by synchronization of a set of ramps on a corresponding set of straight deck sections, with a set of lumber carrying positions of the transfer deck 84, in a manner shown particularly in FIG. 3. In FIG. 3, the transfer sequence is shown for the lumber 112 being transferred from the set of lumber carrying positions 90 to the set of ramps 32. Corresponding letters after any reference numerals in FIG. 3, designate corresponding positions of various components at increasing time increments. Immediately prior to the piece of lumber 112 being transferred to the straight deck set, the set of elevated sections 32 and the piece of lumber 112 are shown in solid lines in FIG. 3. After a period of time the piece of lumber 112a has been pushed onto the higher elevated section 32a by lug 92a and is riding on set 32a such that lugs 92a are now receding behind the piece of lumber 112a. After a further period of time the piece of lumber 112 has moved to the position 112c on the set of ramps at 32c. The set of lugs 40 on set of ramps 32 are now at positions 40c behind the positions of the piece of lumber 112c, while the set of lugs at positions 92c continue to fall behind the set of elevated sections at positions 32c, such that after passage of further time, the upper ends of lugs 92 will clear the piece of lumber 112 as the former are brought past positions 92c and down around sprocket 94.

The piece of lumber continues to move along the transfer deck set on set of ramps 32, and if longitudinal or lengthwise positioning thereof is required, the piston of cylinder 70 is moved from its extreme retracted position to its extreme forward position to thereby move the set of elevated sections 32 from the upper to the lower position. As a result of foregoing, the piece of lumber 112 is deposited upon the corresponding set of lumber carrying surfaces 58 on the chains 56 of angle decks 42. The positioning of lugs 40 adjacent a rear end of the ramps 32, is such as to leave a space between such lugs 40 and piece of lumber 112 so that when piece of lumber 112 is transferred to the angle deck set in the foregoing manner, and begins to move lengthwise as a result of movement therealong, it will not become hung up or caught on lug 40. However, lugs 40 are present should positive pushing of lumber 112 be required. When the piece of lumber 112 has moved an appropriate distance along angle decks 42, as determined by the computer, the set of ramps 32 is again raised into the upper position by activation of cylinder 70 to retract the piston thereof into the extreme retracted position. As a result, the piece of lumber will be lifted off the set of lumber carrying surfaces 58 on the angle deck set, and will again be carried directly transversely straight along the straight deck set. The piece of lumber then is transferred onto the infeed deck 100 as a result of the synchronization between the chains thereon and the chains of the straight deck set as shown most clearly on the left-hand side of FIG. 3. Of course, lumber is fed onto the straight deck set from the transfer deck set 84 at a rate such that at any given time, a piece of lumber is being carried by each of the sets of aligned elevated sections, or their respective sets of lumber carrying surfaces on the angle deck set. Thus, twelve pieces of lumber can be positioned. as required by the positioner for every complete rotation of the chains 30 of the straight deck set, in other words four pieces of lumber every time a set of aligned elevated sections has travelled a distance equal to the distance between the ramps on any chain of a straight deck.

It should be noted that the function of shear plates 43 is to prevent drooping ends of pieces of lumber adjacent chains 56 of angle decks 44, from interfering with the operation of chains 56 by pushing against their sides as the lumber is moved sideways. This is accomplished by the angled surfaces of plates 43 causing such ends to slide upwardly thereover onto or above the upper surface of chains 56.

Various modifications to the lumber positioner and lumber positioning apparatus as described, are of course possible. One such modification comprises simply making the angle decks 42 straight. However, such results in a more complicated drive means for the angle deck sets being required. In addition, a straight angle deck set loses the advantage of lowered lengthwise velocity of the piece of lumber as it travels toward the curved end of the angle decks. Such lowered lengthwise velocity facilitates transfer back to the ramp sets of the straight deck set, since otherwise a larger sudden lengthwise deceleration of the piece of lumber would be required.

Also, positioning accuracy is improved with curved angle sections since a greater transverse movement is required for a given lengthwise movement. Furthermore, other shapes of the angle decks 42 are possible. In addition, all of the straight decks could have three, four, five, or other numbers of sections. Each angle deck could consist of other than continuous belts as described. For example, each angle deck could be a series of rollers, each series extending at a 90° angle to the straight decks (i.e. arranged to move lumber at 90° to the straight deck). In such a case, a movable end fence movable in the direction 90° to the straight deck, would determine the lengthwise movement of the lumber.

Broadly then, it will be seen that in the invention, the basic requirement is for an angle deck set and a straight deck set, with appropriately alignable lumber carrying or lumber contacting surfaces. Each deck of either of the sets may have more than one such surface, with the spacing therebetween being as already described.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A lumber positioner comprising:
   (a) a straight deck set with a purality of spaced apart, parallel, straight decks, each deck having at least one section with a lumber carrying surface movable therealong, the lumber carrying surfaces of corresponding sections of the straight decks defining at least one set of alignable lumber carrying surfaces of the straight decks so as to move lumber sitting thereon in the direction of the straight decks;
   (b) an angle set with a plurality of spaced apart, parallel angle decks disposed transversely of, and in alternating sequence with the straight decks to extend at an angle less than 90 degrees thereto, said angle decks having at least one set of respective, alignable lumber carrying surfaces so as to move lumber sitting thereon in the direction of said angle decks, and which is alignable with said at least one set of lumber carrying surfaces of said straight deck;
   (c) angle and straight deck set drive means for driving both of said at least one sets at relative speeds which maintain them in fixed alignment, when said deck set drive means is driven;
   (d) an elevator means connected to one of said deck sets so that when activated, said elevator means moves said at least one set of lumber carrying surfaces thereof between an upper position and a lower position, in which it is above and below, respectively, said at least one set of lumber carrying surfaces of the other one of said deck sets, such that a piece of lumber extending across aligned members of both sets, can be transferred between respective positions sitting either on said straight deck set or said angle deck set; wherein each of the straight decks has a plurality of parallel sections each with a lumber carrying surface spaced along the deck from the lumber carrying surfaces of the other sections thereof, and each of the angle decks has a plurality of lumber carrying surfaces spaced therealong, the lumber carrying surfaces of corresponding sections of the straight decks defining respective sets of alignable lumber carrying surfaces each of which sets is alignable with a corresponding set of lumber carrying surfaces of said angle deck set, and wherein said elevator means is connected so that when activated said elevator means moves each set of alignable lumber carrying surfaces of said straight deck independently of the other sets thereof, between the upper and lower positions, in which the set is above and below respectively, the corresponding set of lumber carrying surfaces of said angle deck; and wherein the straight decks all have the same number of sections, each of the straight deck sections comprise chains, the sets of alignable lumber carrying surfaces of straight deck comprise surfaces of sets of alignable elevated sections which elevated sections are disposed on outer sides of respective chains, and wherein said elevator means is connected to move each set of elevated sections between the upper and lower positions, by moving the corresponding set of straight deck sections between upper and lower positions thereof, respectively, such that the upper surface of the chains of the straight deck sections when in the upper or lower position, are below the lumber carrying surfaces of said angle decks.

2. A lumber positioner as described in claim 1 wherein the angle decks all have the same number of sections, the angle decks extend at an acute angle to the straight decks, and each of the angle decks comprise chains.

3. A lumber positioner as descibed in claim 1 wherein a plurality of elevated sections are provided on each chain of each straight deck section, which elevated sections are spaced apart thereon a distance equal to the number of sections of the straight deck times a lug spacing of said straight deck.

4. A lumber positioner as described in claim 2 wherein a plurality of elevated sections are provided on each chain of each straight deck section, which elevated sections are spaced apart thereon a distance equal to the number of sections of the straight deck times a lug spacing of said straight deck.

5. A lumber positioner as described in claim 2 additionally comprising a plurality of lugs each extending from adjacent a rear end of each corresponding elevated section in a direction away from the corresponding chain.

6. A lumber positioner as described in claim 3 additionally comprising a plurality of lugs each extending from adjacent a rear end of each corresponding elevated section in a direction away from the corresponding chain.

7. A lumber positioner as described in claim 4 additionally comprising a plurality of lugs each extending from adjacent a rear end of each corresponding elevated section in a direction away from the corresponding chain.

8. A lumber positioner as described in claim 6 wherein the lumber carrying surfaces of each of the angle decks comprise portions of the outer surface thereof, the positioner additionally comprising a plurality of lugs each extending from the outer side of a corresponding chain adjacent the rear end of each lumber carrying surface of said angle deck set.

9. A lumber positioner according to claim 6 comprising:

a lugged transfer deck aligned and synchronized with the straight deck set, and having an outfeed end disposed adjacent an infeed end of said straight deck set, such that pieces of lumber can be transferred from positions on the transfer deck abutting respective sets of lugs thereon, to positions on respective sets of elevated sections forward of the lugs thereon; and transfer deck set drive means for driving said transfer deck at the same rate as said straight deck set.

10. A lumber positioner according to claim 7 comprising:

a lugged transfer deck aligned and synchronized with the straight deck set, and having an outfeed end disposed adjacent an infeed end of said straight deck set, such that pieces of lumber can be transferred from positions on the transfer deck abutting respective sets of lugs thereon, to positions on respective sets of elevated sections forward of the lugs thereon; and transfer deck set drive means for driving said transfer deck at the same rate as said straight deck set.

11. A lumber positioner according to claim 8 comprising:

a lugged transfer deck aligned and synchronized with the straight deck set, and having an outfeed end disposed adjacent an infeed end of said straight deck set, such that pieces of lumber can be transferred from positions on the transfer deck abutting respective sets of lugs thereon, to positions on respective sets of elevated sections forward of the lugs thereon; and transfer deck drive means for driving said transfer deck at the same rate as said straight deck set.

12. A lumber positioning apparatus as described in claim 11 wherein the straight deck set is positioned at a height such that the plane defined by each set of elevated sections when on the upper side of respective chains and in the upper position, is above the lumber carrying surfaces of said transfer deck.

* * * * *